June 12, 1956  F. L. BRAY  2,749,939
DIP-RINSING DEVICE
Filed June 11, 1953
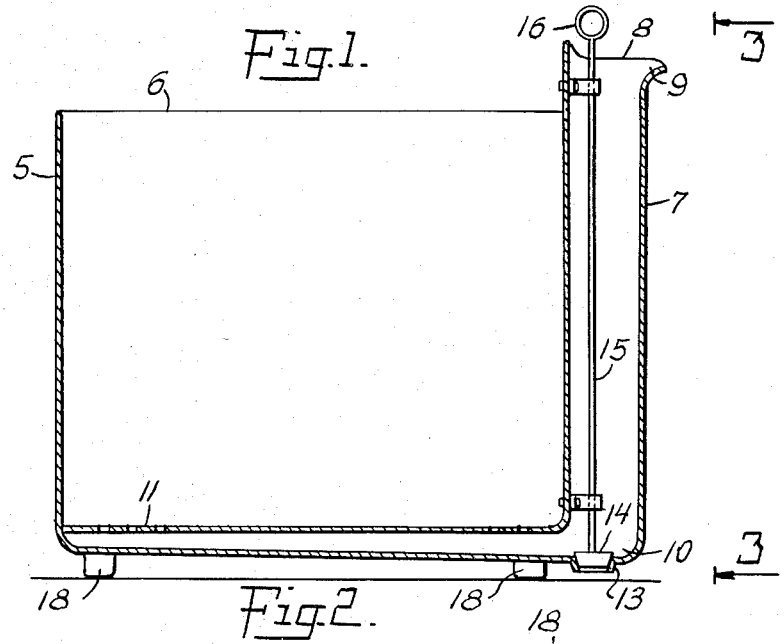
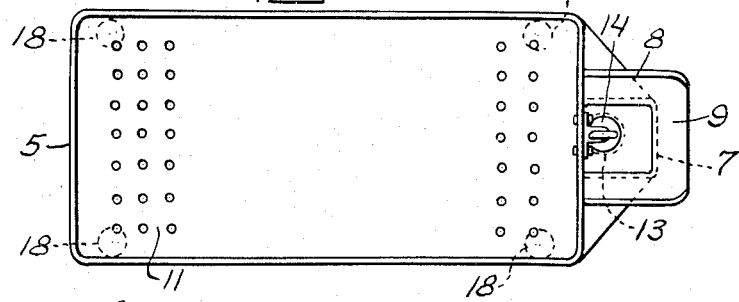
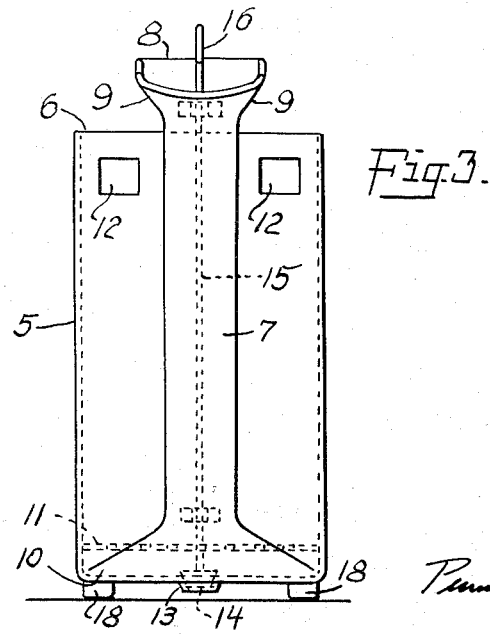
INVENTOR
FREDERIC L. BRAY
BY
ATTORNEYS

United States Patent Office 2,749,939
Patented June 12, 1956

2,749,939

DIP-RINSING DEVICE

Frederic L. Bray, Westbury, N. Y.

Application June 11, 1953, Serial No. 360,905

3 Claims. (Cl. 137—592)

This invention relates to rinsing devices and, more particularly, to a device for facilitating the manual dip-rinsing of dishes, glasses and silverware at a household sink.

In the normal routine of washing dishes in a home, the wash water is contained either in the sink itself or in a dishpan placed in the sink. After the dishes and utensils are washed, they are generally rinsed either by holding them under a stream of water flowing from the faucet outlet or by spraying them with an attachment at the sink. A running stream of water issuing from the faucet outlet wastes a large quantity of hot water and furthermore presents a breakage hazard in that the dish being rinsed may easily be struck against the faucet outlet and thus be chipped or broken. Spray-rinsing of dishes and utensils, generally while held in a rack on the sink drainboard, must be carried out thoroughly in order to insure adequate contact of the rinse water with all parts of the dishes and utensils. The use of the second portion of a double-cavity sink as a rinsing vessel is also unsatisfactory because the water in this sink cavity becomes progressively more soapy as rinsing progresses.

I have now devised a rinsing device which eliminates the shortcomings of the aforementioned conventional rinsing techniques. The dip-rinsing device of my invention comprises a vessel containing clean rinse water into which either an individual dish or a handful of knives, forks and spoons may be immersed for rapid and effective rinsing. This rinsing device comprises an open-topped vessel having a length greater than its width and adapted to hold a body of rinse water. The device is further provided with a conduit communicating with the vessel adjacent the lower portion thereof. The inlet end of the conduit which is preferably a channel-shaped member disposed with its face adjacent one wall of the main vessel, is positioned sufficiently high, with respect to the top of the vessel, as to receive fresh rinse water from a source thereof and, by virtue of its hydrostatic head, deliver this fresh rinse water to the lower portion of the vessel. In this way, the body of rinse water in the vessel may be maintained substantially fresh at all times while nevertheless consuming only a relatively small amount of fresh hot water added in the form of an intermittent or continuous small stream.

These and other novel features of my invention will be more fully understood by reference to the accompanying drawings in which Fig. 1 is a vertical sectional view of the dip-rinser of my invention;

Fig. 2 is a plan view of the device shown in Fig. 1; and

Fig. 3 is an end elevation taken in the direction of the arrows 3—3 in Fig. 1.

The dip-rinsing device shown in Fig. 1 comprises a main rinsing vessel 5. This vessel, as can be seen in Fig. 2, is advantageously provided with a length greater than its width. Its length is such as to accommodate a full-size dish when inserted vertically into the vessel, and its width is sufficient to accommodate the user's hand while grasping a number of knives, forks or spoons. The height of the vessel is also preferably such as to hold a body of rinse water of sufficient depth so as to insure complete immersion of the dish in a single dipping operation. The top 6 of the vessel is open and may if desired be flared outwardly to eliminate all danger of bruising the user's hand on the edges of the rinsing vessel.

The rinsing vessel 5 is further provided, advantageously adjacent one end thereof, with a conduit which communicates with the lower portion of the vessel. In the preferred embodiment of my invention, this conduit is formed by a well 7 built onto one end of the vessel 5. The upper end 8 of the well is open, and is advantageously flared outwardly as indicated at 9, and the lower end 10 of the well communicates directly with the lower portion of the vessel 5. The height of the open inlet end 8 of the well is such, with respect to the height of the main rinse vessel 5, as to permit the development of a hydrostatic head, merely by filling the well, sufficient to cause fresh rinse water in the well to flow downwardly into the lower end of the vessel. In my presently preferred embodiment of the invention, I further provide the rinsing vessel 5 with a perforated false bottom 11 positioned above the level of the communication between the bottom of the well and the lower portion of the rinsing vessel. This arrangement permits fresh rinse water, which is admitted to the open inlet end 8 of the well, to flow downwardly into the well and into the bottom of the rinsing vessel, thence upwardly through the perforations in the false bottom 11 so as to provide an upward flow of rinse water through the rinsing vessel. Although the rinse water thus displaced from the vessel 5 may merely overflow the top edges of its walls, I have found it advantageous to provide one or more overflow openings 12 adjacent the upper portion of the end wall along which the well 7 is positioned so that the ingress and egress of rinse water is confined to that portion of the vessel normally furthest removed from the user.

The dip-rinsing device of my invention is used by setting it in the sink either directly in a body of wash water therein or alongside a dishpan of wash water. After the vessel has been completely filled with clear rinse water by swinging the conventional sink faucet outlet into position either directly over the flared upper end of the well or over the main rinsing vessel, a small trickle of water is allowed to fall into the well from the faucet. This continuous supply of fresh rinse water, which flows through the rinsing device by moving downwardly through the well and thence upwardly through the rinsing vessel, maintains the main body of rinse water in the vessel substantially fresh at all times. Thus, as a washed dish, glass or handful of flatware is removed from the wash water, the user immediately immerses it in the rinsing vessel and then places the rinsed article on a conventional drainboard or drain rack.

In order to facilitate emptying of my novel dip-rinsing device, I presently prefer to provide it with a drain outlet 13, advantageously positioned at the bottom of the filling well. This outlet may be effectively closed by a stopper 14 or other equivalent means actuated by a long rod 15 extending from a handle portion 16 positioned above the top of the filling well down to the stopper. After the rinsing vessel has been emptied by draining it either in this manner or by upsetting it, the entire device may be stored under the sink or it may be hung up by a hinged hanger fixture secured to any appropriate portion of the rinsing device. The bottom of the rinsing vessel may also be provided with legs 18 which insure drainage space between the outlet 13 and the bottom of the sink.

Inasmuch as the height of the body of rinse water in the dip-rinsing device of my invention is generally greater than the height of the body of wash water in which it stands, the vessel will stand steadily upright in the sink, Moreover, because of its relatively small width, the rinsing vessel may be placed in a sink without significantly lessening the washing space in the sink. When the rinsing device actually stands in a body of wash water in the sink, the overflow of rinse water continuously discharges into the body of wash water and serves to maintain the wash water at a suitable temperature. By periodically draining off some of the wash water and adding more detergent, the wash water will thus be maintained in its most effective condition. Accordingly, the dip-rinsing device of my invention is conducive to hygienic washing as well as rinsing and is characterized by the most effective use of a minimum amount of rinse water and by exceptional convenience in use. Moreover, inasmuch as the inlet end of the rinse water conduit of my rinsing device is not directly connected to the water supply faucet, there is no possibility of siphoning of wash water back into the water faucet in the event of a failure of the water supply pressure, and thus my novel rinsing device meets the most rigid requirements of modern municipal water supply ordinances.

I claim:

1. A dip-rinsing device adapted to be set in a household sink and comprising an open-top vessel having a length greater than its width and adapted to hold a body of rinse water, the vessel being provided with an overflow outlet near the top of at least one side wall of the vessel, a perforate false bottom positioned within the vessel, and an inlet conduit composed essentially of a channel member extending substantially the full height of the vessel with the face of the channel adjacent one wall of the vessel, the upper end of the channel member being open and the other end communicating with the vessel below the level of said false bottom, the upper end of the inlet conduit being adapted to receive fresh rinse water from a source thereof and to deliver said fresh rinse water to the lower portion of the vessel below said false bottom.

2. A dip-rinsing device adapted to be set in a household sink and comprising an open-top vessel having a length greater than its width and adapted to hold a body of rinse water, the vessel being provided with an overflow outlet near the top of at least one side wall of the vessel, a perforate false bottom positioned within the vessel, an inlet conduit composed essentially of a channel member extending substantially the full height of the vessel with the face of the channel adjacent one wall of the vessel, the upper end of the channel member being open and the other end communicating with the vessel below the level of said false bottom, the upper end of the inlet conduit being adapted to receive fresh rinse water from a source thereof and to deliver said fresh rinse water to the lower portion of the vessel below said false bottom, a controllable outlet disposed in the lower portion of the vessel for discharging the body of rinse water from the vessel, and a control rod extending from said outlet to a level above the normal level of water in the rinsing device.

3. A dip-rinsing device as set forth in claim 1 in which the lower portion of the vessel is further provided with a controllable outlet for discharging the body of rinse water from the vessel.

References Cited in the file of this patent

UNITED STATES PATENTS

| | | |
|---|---|---|
| 993,898 | Starn | May 30, 1911 |
| 1,161,736 | Sayer | Nov. 23, 1915 |
| 1,427,027 | Silvis | Aug. 22, 1922 |
| 1,778,620 | Barta | Oct. 14, 1930 |

FOREIGN PATENTS

| | | |
|---|---|---|
| 22,833 | Switzerland | Aug. 31, 1901 |